United States Patent
Savage et al.

(10) Patent No.: US 6,224,770 B1
(45) Date of Patent: May 1, 2001

(54) BIOWALL FOR GROUNDWATER REMEDIATION

(75) Inventors: David William Savage, Lebanon; Win-Sow Winston Ho, Annandale; Peter Calcavecchio, Milford; Evelyn Nobles Drake, Bernardsville, all of NJ (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/273,153

(22) Filed: Mar. 19, 1999

(51) Int. Cl.[7] .................................. C02F 3/02; C12M 1/04
(52) U.S. Cl. .................... 210/610; 210/620; 210/747; 210/170; 210/205; 435/262.5; 435/296.1
(58) Field of Search ......................... 210/610, 620, 210/747, 170, 205, 220, 150, 151, 629; 405/128; 435/262, 262.5, 296.1; 166/246

(56) References Cited

U.S. PATENT DOCUMENTS

| | | | |
|---|---|---|---|
| 4,287,070 | * | 9/1981 | Pollock . |
| 4,564,373 | * | 1/1986 | Schmitz et al. . |
| 4,883,594 | * | 11/1989 | Sekoulov et al. . |
| 4,992,174 | * | 2/1991 | Caplan et al. . |
| 5,080,782 | * | 1/1992 | Caplan et al. . |
| 5,116,506 | * | 5/1992 | Williamson et al. . |
| 5,340,376 | * | 8/1994 | Cunningham . |
| 5,453,375 | * | 9/1995 | Stoner et al. . |
| 5,605,634 | * | 2/1997 | Wilson et al. . |
| 5,690,173 | * | 11/1997 | Abdul et al. . |
| 5,874,001 | * | 2/1999 | Carter . |
| 5,942,118 | * | 8/1999 | Besten . |
| 5,957,196 | * | 9/1999 | Gibson et al. . |

* cited by examiner

Primary Examiner—David A. Simmons
Assistant Examiner—Fred Prince
(74) Attorney, Agent, or Firm—Paul E. Purwin

(57) ABSTRACT

The invention is a system and a method for bioremediating hydrocarbon-contaminated groundwater. The method comprises contacting the hydrocarbon-contaminated groundwater with a source of microbial nutrients and then aerating the nutriated water with air or oxygen, the aeration being conducted under substantially bubble-free conditions.

9 Claims, 4 Drawing Sheets

(a)

(b) Spiral-Wound Bale

End View

Side View

BIOWALL FOR GROUNDWATER REMEDIATION

FIELD OF THE INVENTION

The invention relates to a system and method for treating groundwater. More particularly, the invention relates to a system and method for remediating, via microbial action, groundwater contaminated by hydrocarbons and oxygenated compounds such as alcohols, ethers and esters.

BACKGROUND OF INVENTION

Hydrocarbon contamination of soil and groundwater at some locations is a well-known problem. Often the contamination results from past or ongoing industrial activity at the site or nearby. Subsurface contamination, particularly groundwater contamination, is a particularly serious problem because of the groundwater's ability to flow from a contaminated area to other nearby areas that were originally free of such contamination.

Some methods of treating contaminated groundwater are known in the art. Several of these methods employ microbial action in an attempt to bioremediate the contaminated groundwater. For example, U.S. Pat. No. 4,992,174 discloses a method for pumping contaminated groundwater to the surface microbiologically treating the water, and then recirculating the treated water to the contaminated site. Unfortunately, this method requires considerable above-ground equipment associated with the pumps and reactor. U.S. Pat. No. 5,486,291 teaches a microbial reactor that circulates contaminated groundwater through a bubbler supplied with air. The reactor contains fine particles used as microbe substrates. Unfortunately, air bubbles present in the reactor interfere with cell activity, see for example U.S. Pat. No. 4,649,114.

Additionally, U.S. Pat. No. 4,661,458 reveals that the fine particles collide during use resulting in damage to the organisms. Air bubbles present in the bioreactor also undesirably strip out volatile organic compounds present in the groundwater in the reactor.

SUMMARY OF THE INVENTION

In one embodiment, the invention is an in-ground method for enhancing the biodegradation of hydrocarbon contaminated water comprising:

directing the hydrocarbon-contaminated water so as to contact a source of microbial nutrients and an air source in order to form a nutriated, aerated, contaminated water, wherein the air source provides substantially bubble-free air, the directing and contacting being conducted underground.

DETAILED DESCRIPTION OF THE INVENTION

The invention is directed towards bioremediating hydrocarbon-contaminated groundwater. The invention includes bales of controlled release fertilizer and a bubble-free aerator, both present in an in-ground bioreactor. Hydrocarbon-contaminated groundwater in transit through the bioreactor is at least partially decontaminated by microbial action, the microbial action being enhanced by the nutrients and the bubble-free aeration.

Figure 1:
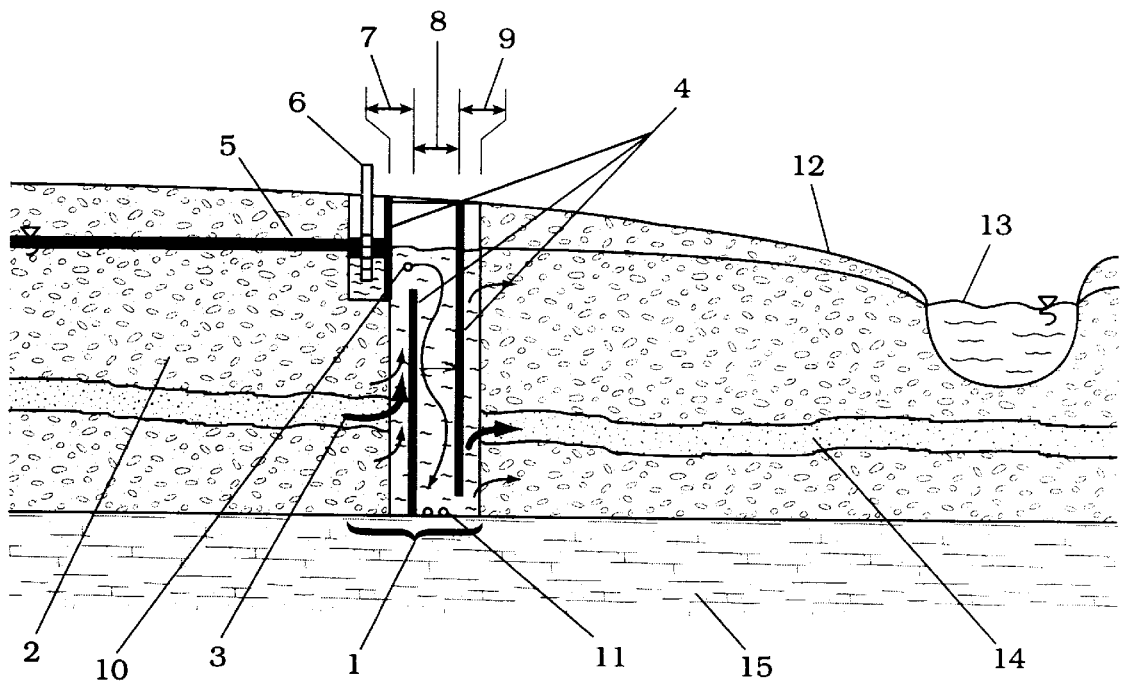
FIG. 1 shows the invention implemented with a vertically-oriented in-ground bioreactor.

In one embodiment of the invention, hydrocarbon-contaminated groundwater is diverted into an in-ground bioreactor as illustrated in FIG. 1. As illustrated in that figure, hydrodynamic forces naturally divert hydrocarbon contaminated ground water (2) into the in-ground bioreactor (8) which contains bales of controlled release fertilizer (10) and a bubble-free aerator (11). As shown in the figure, groundwater passes through the bioreactor, in which the hydrocarbon-contaminated groundwater is nutriated, aerated, and subjected to microbial degradation, resulting in an aqueous effluent that contains fewer hydrocarbon contaminants.

Figure 2:
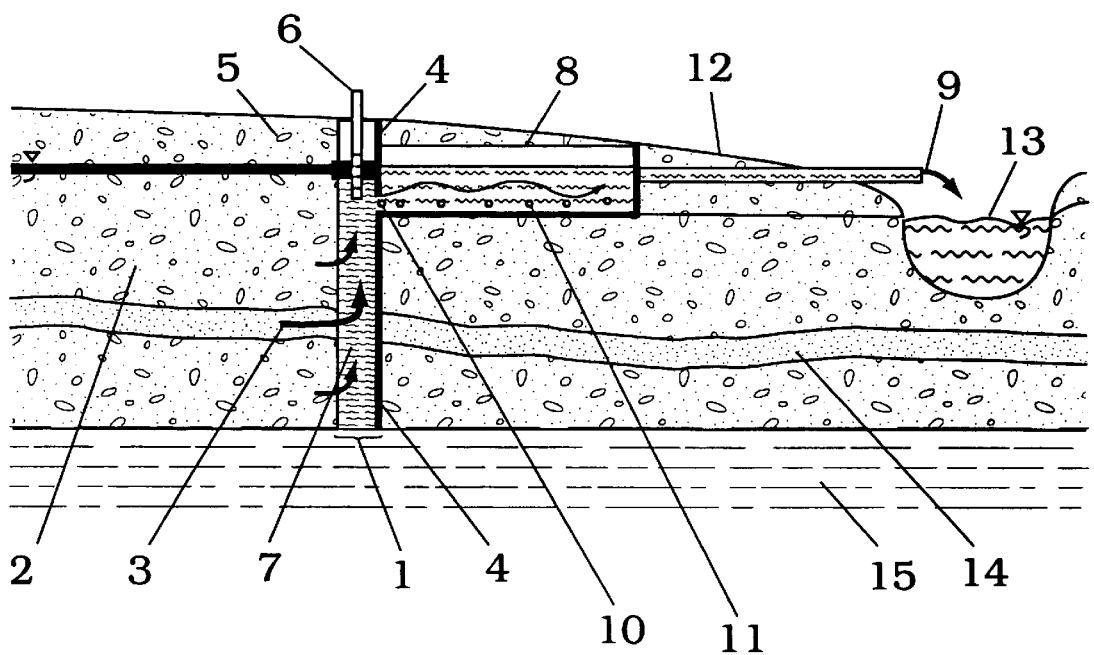
FIG. 2 shows the invention implemented with a horizontally-oriented in-ground bioreactor.

Another embodiment is shown in FIG. 2. While there are similarities in the two embodiments, there are important differences such as in-ground bioreactor (8) being oriented horizontally (FIG. 2) rather than vertically (FIG. 1). The two embodiments are discussed in more detail below. In both FIGS. 1 and 2, like reference numerals correspond to congruent components.

Common to both embodiments is a vertical water-impermeable barrier that directs substantially horizontally-flowing, hydrocarbon contaminated groundwater into a vertical flow that leads the contaminated water to a bioreactor. The impermeable barrier (4) can be formed from any water-impermeable material, though polymeric materials such as high density polyethylene are preferred. The barriers of this invention may be used in combination with barriers that channel the contaminated groundwater horizontally, such as the funnel-gate channel arrangements that are well-known in the art.

The use of the vertical barrier to intercept and redirect the flow of contaminated groundwater through the action of natural hydrodynamic forces is advantageous because alternative methods that make use of pipes and pumps add complexity and cost. The invention, however, can be practiced with any method capable of directing ground water into an in-ground bioreactor.

In the practice of the invention, water directed into the bioreactor contacts microbial nutrients. The nutrient is selected to promote the growth and activity of microbial organis present in the bioreactor. Those organisms are usually indigenous, though in some cases it may be desirable to introduce non-indigenous microrganisms. Microbial nutrients are added to the bioreactor in the form of a nutrient source material ("fertlizer"). The fertilize should be capable of releasing the nutrients over long periods of time (six months or longer) and at temperatures ranging from about 10° C. to well above ambient air temperatures (i.e., up to about 38° C.). Controlled release fertilizer compositions useful in the practice of this invention are set forth in U.S. Pat. Nos. 5,435,821 and 5,429,654, and are incorporated by reference herein.

Figure 3:
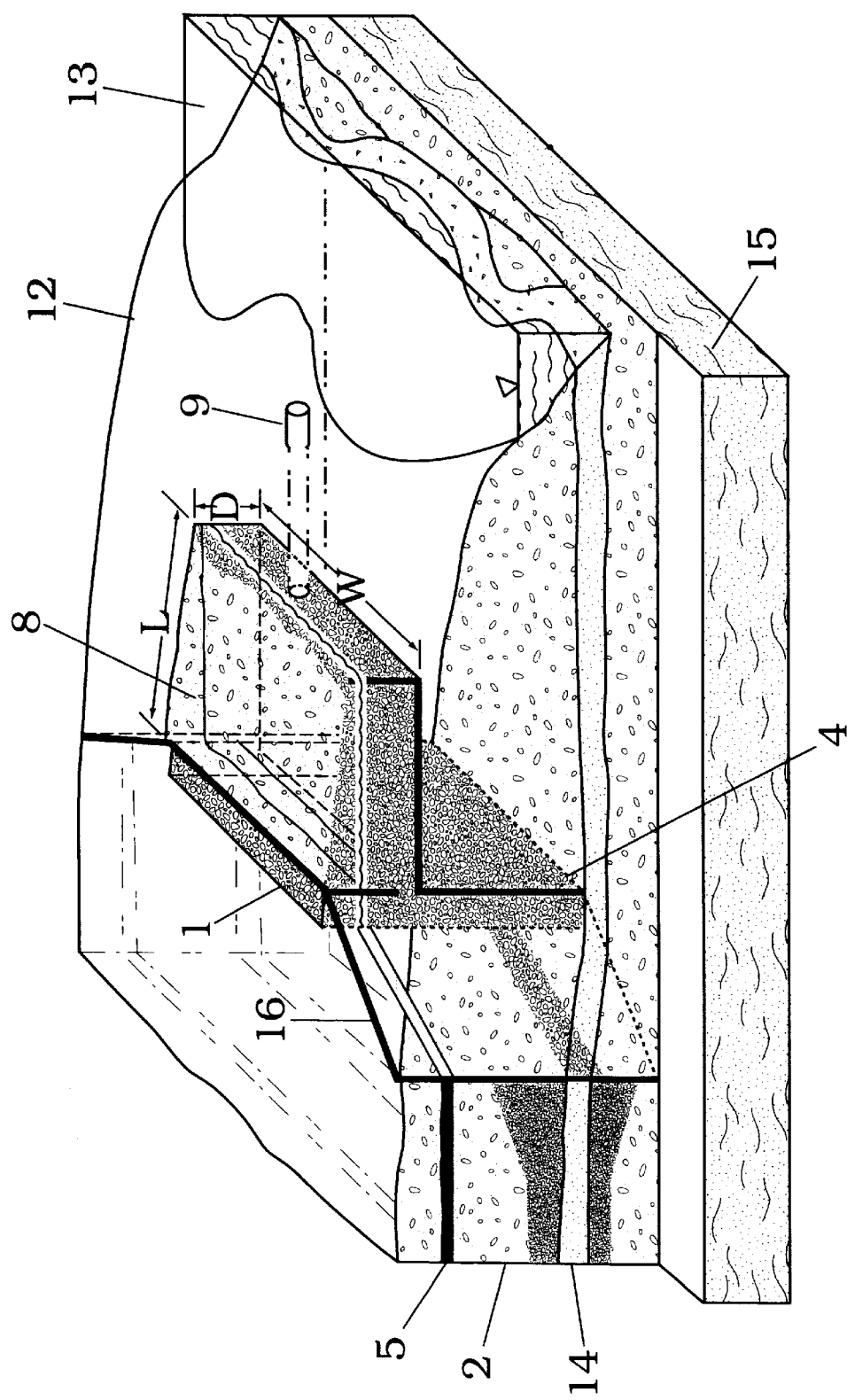
FIG. 3 is an isometric representation of FIG. 2.
Figure 4:
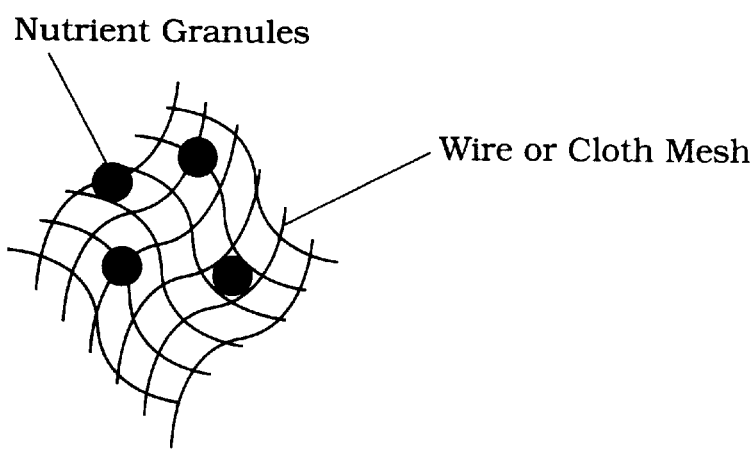
FIG. 4(a) shows nutrient source material, in the form of granules, dispersed on a mesh.
FIG. 4(b) shows the mesh spiral-wound in an end view and side view.
Figure 4:
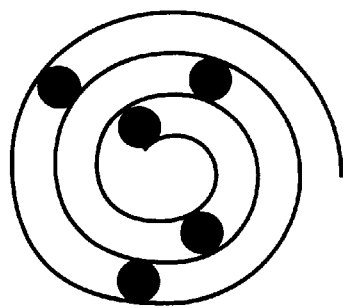
Figure 4:
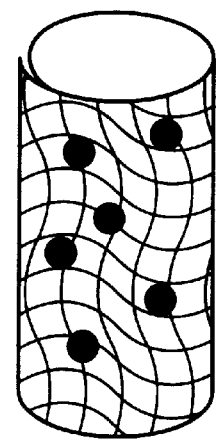

The controlled release fertilizer, preferably in the form of pellets or granules, is brought into contact with the contaminated water entering the in-ground bioreactor at aperture (10). Efficient contacting is obtained when the fertilizer pellets granules (16) are dispersed over a cloth or mesh (17) woven fine enough that the pellets or granules cannot pass therethrough. See FIG. 3a. The pellets are dispersed over the mesh in an areal density ranging from about 5 to about 50%.

The preferred areal density ranges from about 10 to about 40%. The choice of material from which the mesh is formed is not critical, so long as it has sufficient dimensional stability to be formed into a spiral-wound bale as illustrated in FIG. 3b. Preferably, the mesh is formed from polymer or stainless steel in order to avoid problems resulting from corrosion or rust. The bales useful in the practice of the invention range in length (before winding) from about 25 to about 75 meters and width from about 5 to about 15 meters. After winding, bale diameter ranges from about 0.1 meters to about 1.5 meters. In this way, a total fertilizer surface area from about 0.1 $m^2$ to about 1.5 $m^2$ contacts each cubic meter of contaminated water flowing through the bioreactor.

As the now nutriated water flows through the bioreactor, the water is contacted with air oxygen to promote aerobic biological degradation of the organic hydrocarbon contaminants. The aeration should occur without the formation of air bubbles in the water flowing through the bioreactor. Bubbles, if formed, would result in the undesirable stripping of volatile organic contaminants such as benzene, toluene, and xylenes. Bubble formation is prevented by introducing the air or oxygen through a microporous or non-porous membrane, with careful control of the pressure differential across the membrane.

Microporous membranes useful in the practice of the invention have a pore diameter sufficiently small to prevent air bubble formation in the bioreactor. With microporous membranes such as polypropylene, the differential pressure is limited to about 2 to about 3 psi in order to maintain bubble-less aeration. Higher differential pressure may be used with non-porous membranes such as silicone rubber or by placing a thin non-porous coating on to a microporous membrane.

Advantageously, microporous membranes should be hydrophobic and have sufficient porosity to enable aeration.

Suitable microporous membranes include, in order of hydrophobicity, microporous Teflon membranes (such as Gore-Tex™ available from W. L. Gore and Associates, Elkton, Md.) having pores ranging from 0.02 to 0.2 $\mu$m, microporous polyvinylidenefluoride (PVDF) having pores of about 0.4 $\mu$m, microporous polypropylene membranes in the form of flat-sheet membranes having 0.02 $\mu$m pores or 0.04 $\mu$m pores, or hollow-fiber membranes having 20% porosity with 0.02–05 $\mu$m pores and 40% porosity with the same pore size range, and microporous polysulfone (PSF) membranes having about 0.05 $\mu$m pores.

Non-porous membranes can also be used in the practice of the invention. Such membranes are less susceptible fouling than microporous membranes, but also must withstand the higher air pressure differential required to drive the mass transfer.

Membrane geometry is not critical in the practice of the invention. Suitable geometrics include hollow membrane fibers potted into shell-and-tube modules and spiral-wound flat sheet membrane modules. The fibrous sheet modules may be of the flow-through type or the fiber may be dead ended.

The invention is implemented in the geometries set forth in FIGS. 1 and 2 as follows. In both cases a trench traverses a plume of flowing hydrocarbon-contaminated groundwater.

The system of FIG. 1 is advantageous under shallow groundwater conditions. As shown in the figure a relatively thin trench (1) is installed perpendicular to (i.e., across the width of) the plume of contaminated water (2). The trench is constructed deep enough to contact glacial till or bedrock (15). Water-impermeable barriers (4) are installed along the trench at the positions shown. Hydrodynamic forces cause the plume (2) to travel in a vertical direction (3) when the plume contacts a barrier. The barriers partition the trench into three regions, an interception region (7), a treatment region (8), and a distribution region (9). An optional surface-oil skimming well (6) is capable or removing free oil (5) on the surface of the plume.

The interception region, the furthest upstream portion of the trench, is backfilled with aggregate such as soil, stone, gravel, cobble, etc., to a density ranging from 50 to 100% of the normal soil density at the site.

Strata of vying permeability can result in non-uniform groundwater flow, the higher flow being present in the more permeable layers. This effect can lead to "short-circuiting" and inefficient groundwater nutriation unless appropriate countervailing measures are taken. Short-circuiting occurs when contaminated groundwater, following a more permeable path, by-passes all or part of a bioremediation system intended to intercept it. Inefficient nutriation results when nutrients distributed uniformly in a bioreactor contact groundwater that is flowing non-uniformly. The groundwater in high flow regions may have a substantially lower nutrient concentration compared to groundwater contacting nutrients in less permeable regions.

"Short-Circuiting" of the plume is reduced or eliminated in this embodiment because the higher flow through more permeable layers of the ground, such as a sand lense (14), is combined with slower-moving groundwater in layers of tighter strata.

Groundwater nutriation occurs efficiently because the combined groundwater flow, now uniform in velocity and contaminant concentration is directed through a relatively small aperture (10) at the top of the barrier separating regions (7) and (8). The contaminated water can be sampled for process monitoring at or near the aperture and other chemicals useful in the bioremediation process can also be added. A relatively small aperture is therefore used to ensure good and uniform contact between the flowing groundwater and any additive compositions.

The nutriated contaminated groundwater is bioremediated below ground in the reaction zone (8), i.e., the bioreactor. Preferably, the length of the reaction zone is small compared to its depth, ranging in aspect ratio from about 1:5 to about 1:20. However, the reaction zone's width should be large compared to its depth, the preferred aspect ratio ranging from about 3:1 to about 10:1. Such a reactor, being relatively deep compared to its length and filled with uniformly permeable gravel or cobble enables monitoring and control of the bioremediation process. Moreover, these aspect ratio ranges are conducive to groundwater "plug-flow" in a downward direction, which reduces short-circuiting in the bioreactor itself as well as bioreactor volume. Bubble-free free aeration is accomplished through membranes (11) located near the inlet of the reaction zone.

Groundwater is reintroduced into native soil from the distribution zone (9). Flow rates will naturally be higher into more permeable soil layers, such as sand lense (14). Additionally, slopes in the soil surface (12) and natural or artificial basins (13) may make convenient retention areas for the now remediated groundwater. In this way, treated water is reintroduced into the ground with a minimum of disruption to the original flow of the contaminated plume.

The embodiment shown in FIG. 2 also uses water-impermeable barriers (4) to divert a substantially horizontally-flowing plume of contaminated water (2) into a vertical flow (3). Again, free oil (5) on the surface of the plume but below ground-level (12) may be collected in an optional oil skimming well (6).

As in the embodiment of FIG. 1, the trench has an interception zone (7) that is excavated transversely across the width of the plume down to the depth of glacial till or bedrock (15), and is then backfilled. An isometric view of this embodiment is shown in FIG. 2.

The now upward-flowing plume passes into the reaction zone (the bioreactor) (8) through an aperture 10. Nutrients and other compositions used in the bioremediation process may be conveniently added at the aperture. As in the system of FIG. 1, the relatively small aperture results in good and uniform contact between the groundwater and the nutrient source material. The reactor zone (8) is not excavated down to the glacial till or bedrock, rather it is excavated to a depth determined by bioreactor fluid flow considerations. The reactor zone is backfilled with gravel or cobble having about 30 to about 70% solid volume, and the bubble-free aeration membranes (11) are located at or near the reaction zone's inlet. In the system of FIG. 1, the entire reactor can be prefabricated and lowered into the proper position. The length of the reaction zone should be large compared to its depth, with an aspect ratio ranging from about 5:1 to about 20:1 being preferred.

As shown in the figure, the nutriated water is subjected to bubble-free aeration during substantially all of its tortuous path through the bioreactor, thereby enhancing the bioremediation process. As in the system of FIG. 1, the relatively long and thin reaction zone allows for monitoring and control of the bioremediation process.

Unlike the configuration of FIG. 1, the distribution zone (9) is a channel or pipe in which the treated water leaves the reaction zone. The distribution zone can lead down gradient (12) to a surface depression (13), or an infiltration gallery or well network can be used to reintroduce the treated water into the aquifer, especially sand lenses (14) and other regions of high soil permeability. The invention is compatible with solid barriers (shown as (16) in FIG. 3) for focusing the flowing groundwater horizontally so that the width of the interception trench can be reduced.

As can be readily appreciated, this embodiment can be implemented in a side-by-side arrangement of identical systems located across the plume. The outputs of treated water can be manifolded together into a single pipe or channel for monitoring purposes. Moreover, elevation control of this outfall piping can provide a measure of groundwater flow and reaction zone residence times.

An important feature of the systems of FIGS. 1 and 2 is that the reaction zone is isolated from the surrounding soil layers by water-impermeable barriers. Such barriers prevent bioremediation from occurring in soil layers of varying permeability, which would lead to "short-circuiting" and plugging. Moreover, isolation from the surrounding groundwater allows separation of the reaction zone under oxygen-limiting conditions, such conditions being required for the biological degradation of organic compounds such as highly chlorinated polyaromatic molecules.

What is claimed is:

1. A system for treatment of hydrocarbon-contaminated ground water comprising:

an underground bioreactor having an inlet at a first end and an outlet at a second end;

barrier means for diverting a plume of the hydrocarbon-contaminated groundwater into the inlet of the underground bioreactor;

means for supplying microbial nutrients proximate the inlet of the bioreactor; and means for supplying substantially bubble-free oxygen or air to the bioreactor.

2. The system of claim 1 wherein the means for supplying microbial nutrients comprises a controlled release fertilizer having a microbial nutrient release rate of at least six months at a temperature ranging from about 10° C. to about 38° C.

3. The system of claim 2 wherein the controlled release fertilizer is in the form of pellets dispersed over an inorganic mesh, the inorganic mesh being in the form of a spiral-wound bale.

4. A method for enhancing the biodegradation of hydrocarbon-contaminated water comprising:

directing the hydrocarbon-contaminated water to flow through an in-ground bioreactor and in contact with a source of microbial nutrients therein while introducing oxygen or air into the water in the bioreactor, the nutrients being controlled release pellets dispersed over an inorganic mesh in the form of a spiral-wound bale, and the oxygen or air being introduced substantially bubble free, thereby enhancing the biodegradation of the hydrocarbon-contaminated water.

5. The system of claim 3 wherein the bioreactor is vertically disposed in the ground and wherein the inlet is at the top and the outlet at the bottom of the bioreactor.

6. If The system of claim 3 wherein the bioreactor is disposed horizontally in the ground.

7. A method for enhancing the bioremediation of a substantially horizontally flowig plume of hydrocarbon-contaminated ground water comprising:

disposing a bioreactor in the ground in the direction of the flow of the groundwater, the reactor having an inlet at a first end and an outlet at a second end;

directing the flow of the ground water upwardly to the inlet of the bioreactor for introduction into and passage through the bioreactor;

supplying microbial nutrients to the bioreactor proximate the inlet whereby the ground water introduced therein is nutriated;

supplying substantially bubble-free oxygen or air to the nutriated water in the bioreactor whereby the nutriated water is aerated;

thereby enhancing the bioremediation of the contaminated groundwater.

8. The method of claim 7 wherein the microbial nutrients are supplied to the bioreactor in the form of a controlled release nutrient.

9. The method of claim 8 wherein the controlled release nutrient are pellets disposed on a inorganic mesh wound in the shape of a bale.

* * * * *